United States Patent
Lee et al.

(10) Patent No.: US 9,033,118 B2
(45) Date of Patent: May 19, 2015

(54) CARBON-CERAMIC BRAKE DISK

(75) Inventors: Junsang Lee, Seoul (KR); Hyunkyu Shin, Changwon-si (KR); Yeonho Choi, Jeonju-si (KR); Chaewook Cho, Daejeon (KR); Jungsuk Kang, Jeonju-si (KR); Dongwon Im, Gimhae-si (KR); Byunggun Chea, Jeonju-si (KR); Moonsoo Choi, Jeonju-si (KR)

(73) Assignee: DACC CARBON (KR)

( * ) Notice: Subject to any disclaimer, the term of this patent is extended or adjusted under 35 U.S.C. 154(b) by 59 days.

(21) Appl. No.: 13/990,111

(22) PCT Filed: Nov. 28, 2011

(86) PCT No.: PCT/KR2011/009127
§ 371 (c)(1),
(2), (4) Date: May 29, 2013

(87) PCT Pub. No.: WO2012/074259
PCT Pub. Date: Jun. 7, 2012

(65) Prior Publication Data
US 2013/0248304 A1    Sep. 26, 2013

(30) Foreign Application Priority Data
Nov. 29, 2010    (KR) .......................... 10-2010-0119595

(51) Int. Cl.
*F16D 65/12*    (2006.01)
*F16D 65/28*    (2006.01)
*F16D 69/00*    (2006.01)

(52) U.S. Cl.
CPC ................ *F16D 65/28* (2013.01); *F16D 65/12* (2013.01); *F16D 2069/004* (2013.01); *F16D 2200/0047* (2013.01); *F16D 65/126* (2013.01)

(58) Field of Classification Search
CPC ............................. F16D 65/125; F16D 65/128
USPC ............ 188/218 R, 218 XL, 264 A, 264 AA, 188/264 R, 71.1, 71.6, 73.1
See application file for complete search history.

(56) References Cited

U.S. PATENT DOCUMENTS

| 7,100,748 B2 | 9/2006 | Prahst | |
| 2007/0181390 A1* | 8/2007 | Korm | 188/218 XL |

(Continued)

FOREIGN PATENT DOCUMENTS

| DE | 19824465 A1 * | 12/1999 | ............. F16D 65/12 |
| JP | 61282633 A  * | 12/1986 | ............. F16D 65/12 |

(Continued)

OTHER PUBLICATIONS

Abstract of JP 61-282633.*
(Continued)

*Primary Examiner* — Nicholas J Lane
(74) *Attorney, Agent, or Firm* — Cantor Colburn LLP (57) ABSTRACT

The present invention relates to a carbon-ceramic brake disc, and the present invention includes a plurality of heat dissipation holes formed in a frictional surface; a curved surface formed between the frictional surface and an inner surface of the hole dissipation hole; and a groove formed at the inner surface of the heat dissipation hole. According to the present invention, in a brake system, when brake pads press the frictional surfaces of the carbon-ceramic brake disc brake to generate braking force, frictional heat in the carbon-ceramic brake disc is effectively dissipated to the outside. That is, the carbon-ceramic brake disc is effectively cooled. Thus, the transferring of the frictional heat generated in the carbon-ceramic brake disc to a hat part is reduced, so that it is possible to minimize deformation of the carbon-ceramic brake disc and the hat part.

5 Claims, 6 Drawing Sheets

(56) References Cited

U.S. PATENT DOCUMENTS

2007/0193837 A1* 8/2007 Lamb .................. 188/218 XL
2008/0289918 A1* 11/2008 Boike et al. ............ 188/218 XL

FOREIGN PATENT DOCUMENTS

| | | |
|---|---|---|
| JP | 2004068826 | 3/2004 |
| JP | 2004239431 | 8/2004 |
| KR | 20050069669 | 7/2005 |
| KR | 20090087181 | 8/2009 |

OTHER PUBLICATIONS

Machine translation of DE 198 24 465 (no date).*

International Search Report—PCT/KR2011/009127 dated Aug. 28, 2012.

* cited by examiner

CARBON-CERAMIC BRAKE DISK

TECHNICAL FIELD

The present invention relates to a carbon-ceramic brake disc.

BACKGROUND ART

Figure 1:
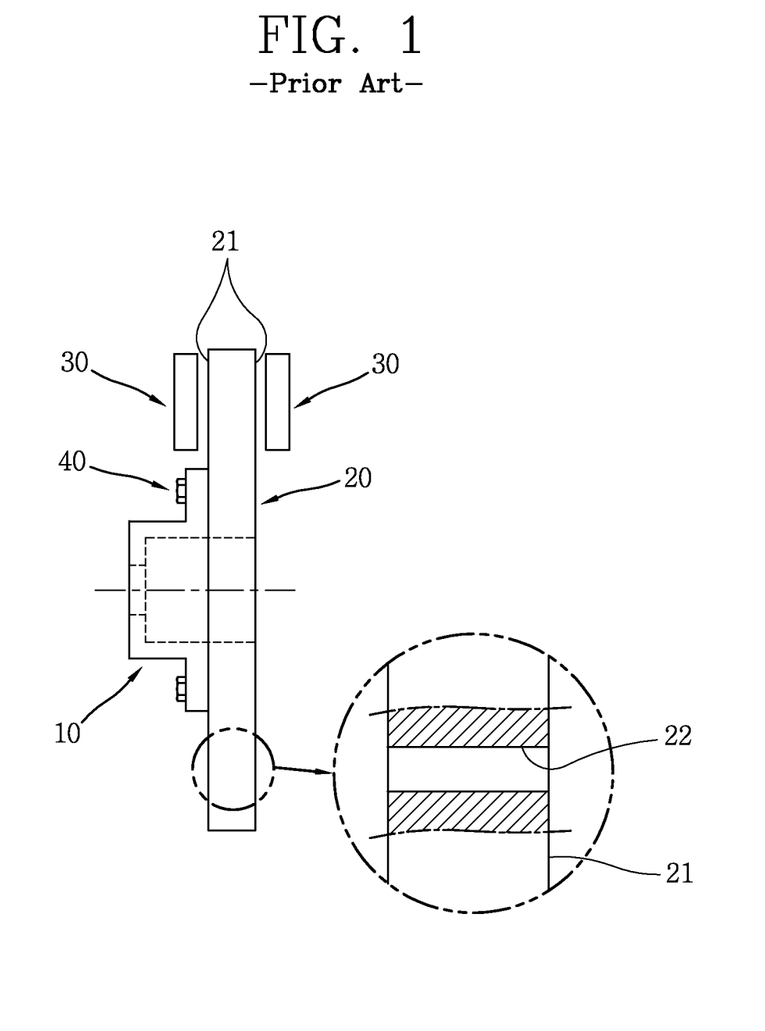
FIG. 1 is a side view illustrating a general brake system.

As illustrated in FIG. 1, a brake system of a vehicle includes a hat part (referred to as a hub) 10 connected to an axle, a brake disc 20 connected to the hat part 10, brake pads (also referred to as a lining) 30 located at a position adjacent to frictional surfaces 21 of the brake disc 20 to selectively press the frictional surfaces 21 of the brake disc 20. The hat part 10 is connected to the axle through a connection means (not shown), and the brake disc 20 and the hat part 10 are connected to each other through a connection means 40.

As for the brake system, when the brake pads 30 press the frictional surfaces 21 of the brake disc 20, by slowing or stopping rotation of the brake disc 20 due to frictional force caused by friction between the frictional surfaces 21 of the brake disc 20 and the brake pads 30, a speed of a vehicle equipped with the brake system is reduced, or the vehicle equipped with the brake system is stopped.

In recent years, many expressways have been constructed, and thus drivers experience more high-speed driving. In addition, as the number of components of the vehicle required for driver's convenience and safety is increased, a weight of the vehicle is continuously increased. In order to stop a heavy-weight vehicle driving at a high speed, the brake disc 20 and the brake pads 30 having high level of braking ability are needed.

To achieve this, the brake disk 20 and the brake pads 30 are recently manufactured using carbon-fiber-reinforced ceramic composites having thermal impact resistance and wear resistance.

The carbon-fiber-reinforced ceramic composites are carbon-fiber-reinforced materials using ceramic matrixes. Hereinafter, the brake disc 20 that is manufactured using carbon-fiber-reinforced ceramic composites is referred to as a carbon-ceramic brake disc 20.

In the brake system, when the brake pads 30 press the frictional surfaces 21 of the brake disc 20 to generate braking force in the brake disc 20, high-temperature frictional heat is generated in the brake disc 20 and the brake pads 30. When the high-temperature heat generated in the brake disc 20 is not smoothly dissipated to the outside, the brake disc 20 or the hat part 10 may be distorted (deformed) due to a difference between thermal expansion coefficients of the hat part 10 connected to the brake disc 20 and the brake disc 20.

As a method of dissipating the heat generated in the brake disc 20 to the outside, a plurality of heat dissipation holes 22 is formed in the frictional surfaces 21 of the brake disc 20. The heat dissipation holes 22 penetrate the frictional surfaces 21 at both sides of the brake disc 20 to be perpendicular to the frictional surface 21.

Unfortunately, since the plurality of heat dissipation holes formed in the frictional surface 21 of the brake disc 20 has a small contact area with the outside and the heat is not smoothly transferred, it is difficult to effectively dissipate the heat generated in the brake disc 20 to the outside.

DETAILED DESCRIPTION OF THE INVENTION

Technical Problem

An object of the present invention is to effectively dissipate frictional heat generated in a brake disc to the outside when braking force is generated in a brake system.

Technical Solution

In order to achieve the above object, there is provided a carbon-ceramic brake disc including a plurality of heat dissipation holes formed in a frictional surface; and a groove formed at an inner surface of the heat dissipation hole.

Further, in order to achieve the above object, there is provided a carbon-ceramic brake disc including a plurality of heat dissipation holes formed in a frictional surface; a curved surface formed between the frictional surface and an inner surface of the hole dissipation hole; and a groove formed at the inner surface of the heat dissipation hole.

Furthermore, in order to achieve the above object, there is provided a carbon-ceramic brake disc including a plurality of heat dissipation holes formed in a frictional surface; an inclined plane surface formed between the frictional surface and an inner surface of the hole dissipation hole; and a groove formed at the inner surface of the heat dissipation hole.

The groove may preferably have a spiral shape.

The groove may preferably have a curve shape having a predetermined width and depth, and the groove may be formed in plural number.

Moreover, in order to achieve the above object, there is provided a carbon-ceramic brake disc including a plurality of heat dissipation holes formed in a frictional surface; and a curved surface formed between the frictional surface and an inner surface of the hole dissipation hole.

Advantageous Effect

According to the present invention, when the air flows through the heat dissipation holes, the contact area with the air is increased, so that an area for dissipating the heat is increased. Thus, the frictional heat is effectively dissipated to the outside. In addition, when the groove has a curve shape or a spiral shape, a vortex is generated by allowing the air to flow through the heat dissipation holes during the rotation of the carbon-ceramic brake disc, so that the flow of the air become fast. As a result, the frictional heat is more effectively dissipated to the outside. Furthermore, since the curved surfaces are formed between the frictional surfaces and the inner surface of the heat dissipation hole, the air can smoothly flow into and be discharged from the heat dissipation holes, so that the frictional heat is more effectively dissipated to the outside. That is, the carbon-ceramic brake disc is more effectively cooled. Thus, the transferring of the frictional heat generated in the carbon-ceramic brake disc to the hat part is reduced, so that it is possible to minimize deformation of the carbon-ceramic brake disc and the hat part.

EMBODIMENTS FOR CARRYING OUT THE INVENTION

Hereinafter, a carbon-ceramic brake disc according to embodiments of the present invention will be described with reference to the accompanying drawings.

Figure 2:
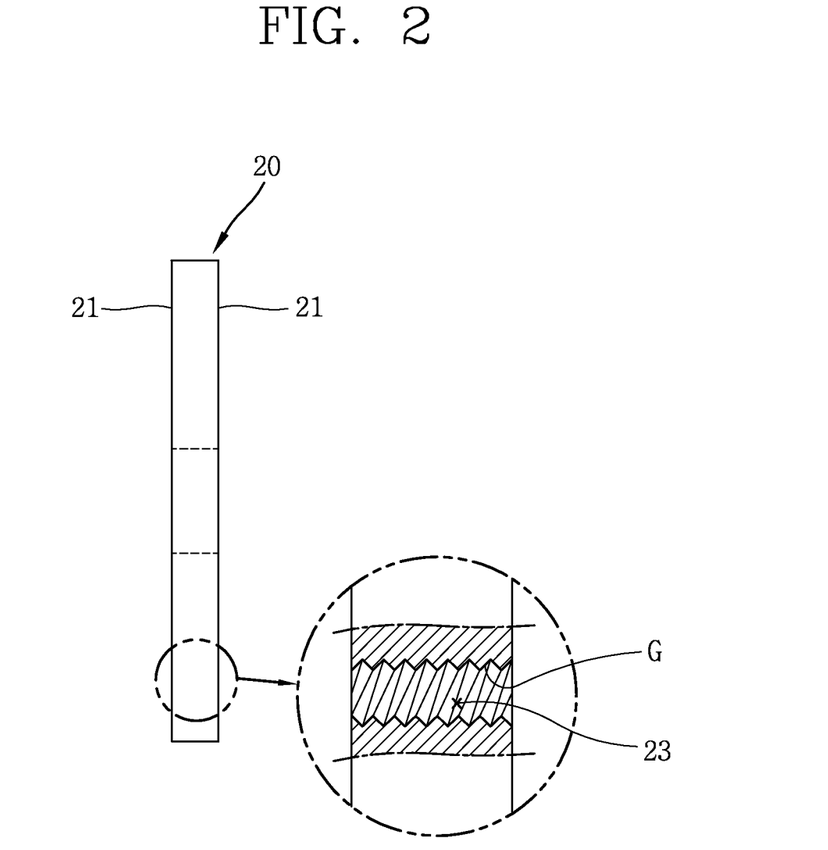
FIG. 2 is a side view illustrating a carbon-ceramic brake disc according to a first embodiment of the present invention.
Figure 3:
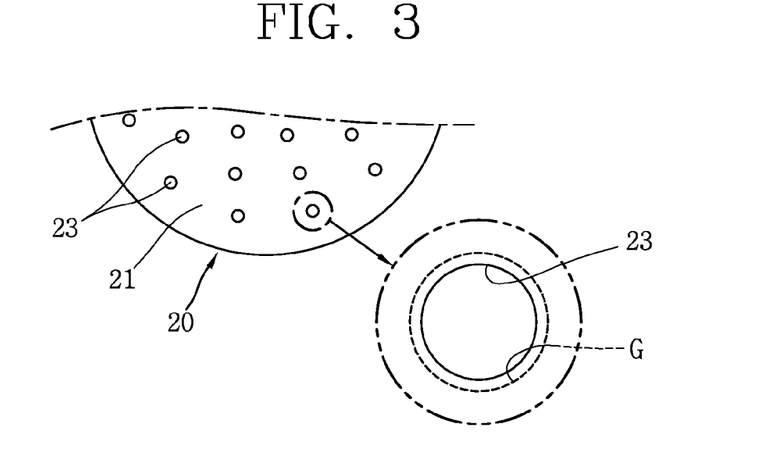
FIG. 3 is a front view illustrating the carbon-ceramic brake disc according to the first embodiment.

FIG. 2 is a side view illustrating a carbon-ceramic brake disc according to a first embodiment of the present invention. FIG. 3 is a front view illustrating the carbon-ceramic brake disc according to the first embodiment.

As illustrated in FIGS. 2 and 3, the carbon-ceramic brake disc according to the first embodiment has a disc shape having a certain thickness, and includes the frictional surface 21 respectively formed at both sides.

A plurality of heat dissipation holes 23 is formed in the frictional surfaces 21, and grooves G are formed at an inner surface of the heat dissipation hole 23.

The heat dissipation holes 23 penetrate from one frictional surface 21 to the other frictional surface 21. It is preferable to allow inner diameters of the heat dissipation holes 23 to be uniform. The inner diameter of the heat dissipation hole 23 may be preferably in a range of 3 to 10 mm, and more preferably, in a range of 4 to 7 mm.

The heat dissipation hole 23 may have a cross section of an elliptic shape or a quadrangle shape.

The groove G is formed in a spiral shape. The spiral shape is in the form of a female screw formed at the inner surface of the heat dissipation hole 23.

Figure 4:
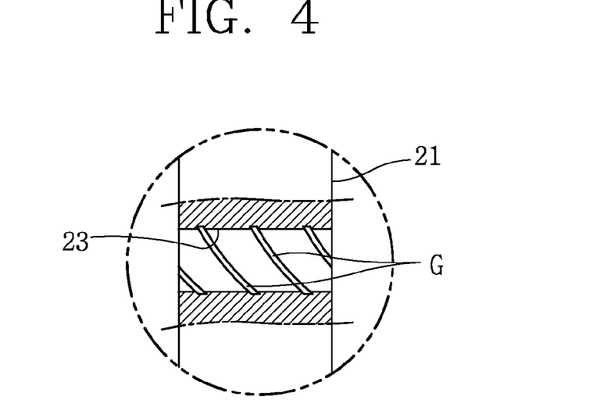
FIG. 4 is a side view illustrating another embodiment of a groove included in the carbon-ceramic brake disc according to the first embodiment.
Figure 5:
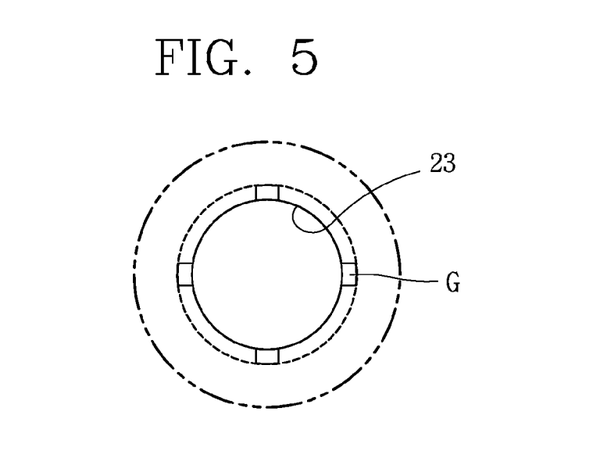
FIG. 5 is a side view illustrating still another embodiment of the groove included in the carbon-ceramic brake disc according to a second embodiment.

As illustrated in FIGS. 4 and 5, another embodiment of the groove G is in the form of a curve having a certain width and depth, and the groove G is provided in plural number. The curve-shaped groove G penetrates the both frictional surfaces 21. It is preferable to arrange the grooves G at the inner surfaces of the heat dissipation holes 23 in a circumferential direction at a regular interval.

Figure 6:
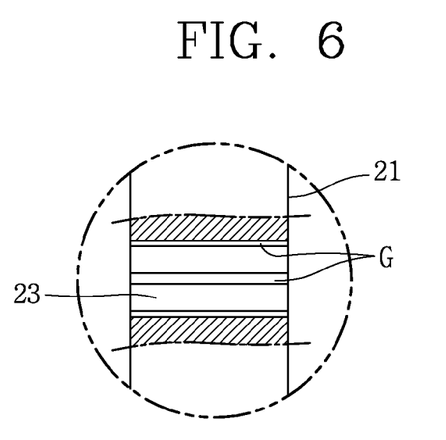
FIG. 6 is a side view illustrating still another embodiment of the groove included in the carbon-ceramic brake disc according to the first embodiment.

As illustrated in FIG. 6, another embodiment of the groove G, the groove G is in the form of a straight line having a certain width and depth, and the groove G is provided in plural number. The straight line-shaped groove G penetrates the both frictional surfaces 21. It is preferable to arrange the grooves G at the inner surfaces of the heat dissipation holes 23 in a circumferential direction at a regular interval.

In the carbon-ceramic brake disc according to the first embodiment, since the grooves G are formed at the inner surface of the heat dissipation hole 23, when air flows through the heat dissipation holes 23, a contact area with the air is increased compared to a case where only the heat dissipation holes 23 are formed. In addition, when the groove G has a curve shape or a spiral shape, a vortex is generated by allowing the air to flow through the heat dissipation holes 23 during the rotation of the carbon-ceramic brake disc.

Figure 7:
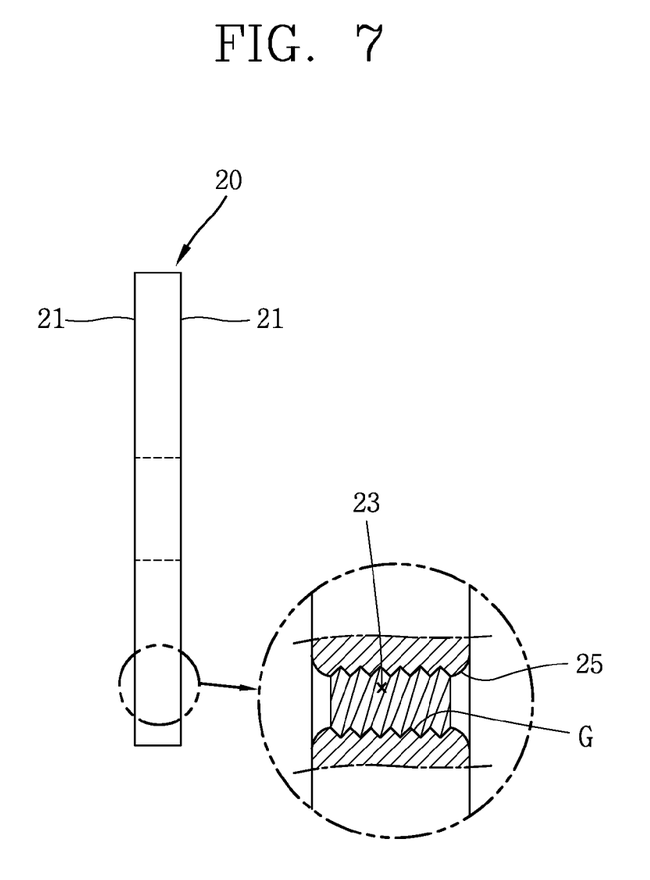
FIG. 7 is a side view illustrating a carbon-ceramic brake disc according to the second embodiment of the present invention.

FIG. 7 is a side view illustrating a carbon-ceramic brake disc according to the second embodiment of the present invention.

As illustrated in FIG. 7, the carbon-ceramic brake disc according to the second embodiment includes a plurality of heat dissipation holes 23 formed in frictional surfaces 21; curved surfaces 24 formed between the frictional surfaces 21 and an inner surface of the heat dissipation hole 23; and grooves C formed at the inner surface of the heat dissipation hole 23.

The carbon-ceramic brake disc 20 has a disc shape having a certain thickness, and includes the frictional surfaces 21 formed at both sides thereof. The heat dissipation holes 23 penetrate from one frictional surface 21 to the other frictional surface 21. It is preferable to allow inner diameters of the heat dissipation holes 23 to be uniform. The inner diameter of the heat dissipation hole 23 may be preferably in a range of 3 to 10 mm, and more preferably, in a range of 4 to 7 mm.

The heat dissipation hole 23 may have a cross section of an elliptic shape or a quadrangle shape.

The curved surface 24 is a convex curved surface, and enables air to smoothly flow into the heat dissipation holes 23. A radius of curvature of the curved surface 24 is preferably in a range of 0.5 to 1 mm. The curved surfaces 24 are formed at the both frictional surfaces 21.

Figure 8:
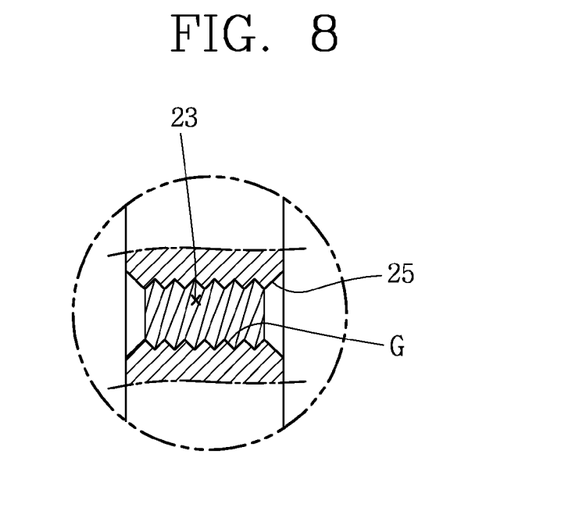
FIG. 8 is a side view illustrating an inclined plane surface included in the carbon-ceramic brake disc according to the second embodiment of the present invention.

Meanwhile, as illustrated in FIG. 8, instead of the curved surfaces, inclined plane surfaces 25 for enabling the air to smoothly flow into the heat dissipation holes 23 are formed between the frictional surfaces 21 and the inner surface of the heat dissipation hole 23. An inclined angle of the inclined plane surface 25 is preferably in a range of 15 degrees to 75 degrees with respect to the frictional surface 21.

The groove G is formed in a spiral shape. The spiral shape is in the form of a female screw formed at the inner surface of the heat dissipation hole 23.

Another embodiment of the groove G is in the form of a curve having a certain width and depth, and the groove G is provided in plural number. The curve-shaped groove G penetrates the both frictional surfaces 21. It is preferable to arrange the grooves G at the inner surfaces of the heat dissipation holes 23 in a circumferential direction at a regular interval.

As illustrated in FIG. 6, another embodiment of the groove G, the groove G is in the form of a straight line having a certain width and depth, and the groove G is provided in plural number. The straight line-shaped groove G penetrates the both frictional surfaces 21. It is preferable to arrange the grooves G at the inner surfaces of the heat dissipation holes 23 in a circumferential direction at a regular interval.

In the carbon-ceramic brake disc according to the second embodiment, since the grooves G are formed at the inner surface of the heat dissipation hole 23, when air flows through the heat dissipation holes 23, a contact area with the air is increased compared to a case where only the heat dissipation holes 23 are formed. In addition, when the groove G has a curve shape or a spiral shape, a vortex is generated by allowing the air to flow through the heat dissipation holes 23 during the rotation of the carbon-ceramic brake disc. Moreover, the air smoothly flows through the heat dissipation holes 23 and the grooves G.

Figure 9:
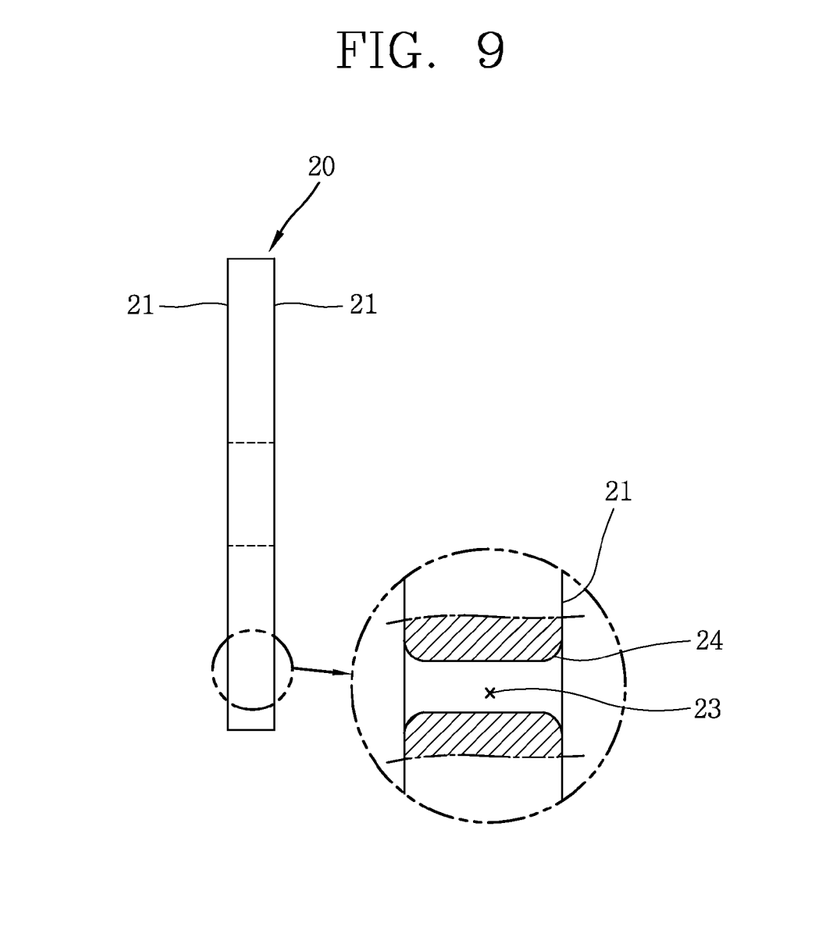
FIG. 9 is a side view illustrating a carbon-ceramic brake disc according to a third embodiment of the present invention.

FIG. 9 is a side view illustrating a carbon-ceramic brake disc 20 according to a third embodiment of the present invention.

As illustrated in FIG. 9, the carbon-ceramic brake disc 20 according to the third embodiment includes a plurality of heat dissipation holes 23 formed in frictional surfaces 21; and curved surfaces 24 formed between the frictional surfaces 21 and an inner surface of the heat dissipation hole 23.

The carbon-ceramic brake disc 20 has a disc shape having a certain thickness, and includes the frictional surfaces 21 formed at both sides thereof. The heat dissipation holes 23 penetrate from one frictional surface 21 to the other frictional surface 21. It is preferable to allow inner diameters of the heat dissipation holes 23 to be uniform. The inner diameter of the heat dissipation hole 23 may be preferably in a range of 3 to 10 mm, and more preferably, in a range of 4 to 7 mm.

The heat dissipation hole 23 may have a cross section of an elliptic shape or a quadrangle shape.

The curved surface 24 is a convex curved surface, and enables air to smoothly flow into the heat dissipation holes 23. A radius of curvature of the curved surface 24 is preferably in a range of 0.5 to 1 mm. The curved surfaces 24 are formed at the both frictional surfaces 21.

Figure 10:
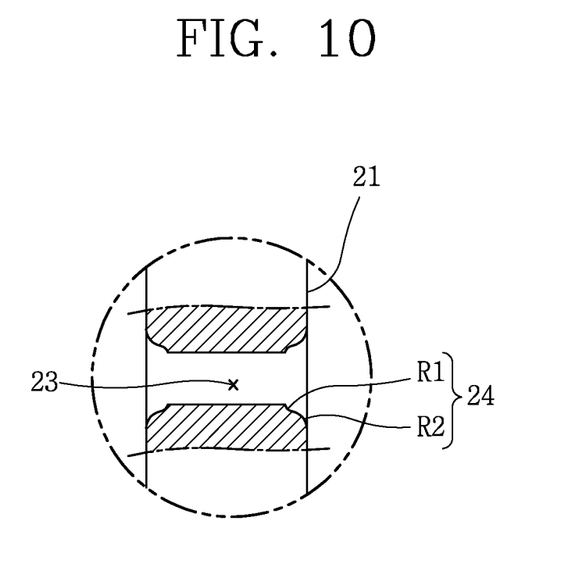
FIG. 10 is a side view illustrating another embodiment of a curved surface include in the carbon-ceramic brake disc according to the third embodiment of the present invention.

As illustrated in FIG. 10, as another embodiment of the curved surface 24, the curved surface 24 includes two curved surfaces. The two curved surfaces include a convex curved surface R1 located at a position adjacent to the frictional surface 21 and a concave curved surface R2 formed to be continuous to the convex curved surface R1.

Since the curved surfaces 24 are formed between the frictional surfaces 21 and the inner surface of the heat dissipation hole 23, it is possible to allow the air to smoothly flow through the heat dissipation holes 23.

The heat dissipation holes 23, the grooves G the curved surfaces 24, or the inclined plane surfaces 25 included in the carbon-ceramic brake disc according to the first, second, and third embodiments of the present invention are preferably formed after a cured process or a carbonizing process in a process of manufacturing the carbon-ceramic brake disc.

The process of manufacturing the carbon-ceramic brake disc is as follows.

Firstly, scraps of carbon fibers, resins, and an additive are mixed to produce a mixture. The additive may not be included in the mixture. The mixture is injected into a mold. The mixture injected into the mold is pressed at a high temperature under a high pressure to cure the mixture, so that a molded body having a brake disc shape is produced. The mixture is heated in a furnace at a high temperature to be carbonized. Silicon powders are melted at the high temperature to be infiltrated into the carbonized molded body. The temperature for melting the silicon powders is higher than the temperature for carbonizing the molded body. The melted silicon is infiltrated into the carbonized molded body, and thus the carbonized molded body becomes the carbon-ceramic brake disc.

During the manufacturing process, the heat dissipation holes 23, the grooves G, the curved surfaces 24 or the inclined plane surfaces 25 is preferably formed at the molded body, or the molded body or the carbonized molded body in a state of the carbonized molded body obtained by carbonizing the molded body. When the heat dissipation holes 23, the grooves G, the curved surfaces 24 or the inclined plane surfaces 25 is formed at the molded body, or the molded body or the carbonized molded body in a state of the carbonized molded body obtained by carbonizing the molded body, since the material has ductility, it is easy to perform processing.

Hereinafter, operations and effects of the carbon-ceramic brake disc according to the present invention.

A brake system equipped with the carbon-ceramic brake disc according to the present invention is mounted in a vehicle. When a speed is reduced or stopped at the time of the driving of a vehicle, the frictional surfaces 21 of the carbon-ceramic brake disc 20 is pressed by the brake pads 30. When the brake pads 30 press the frictional surfaces 21 of the carbon-ceramic brake disc 20, by reducing or stopping a rotation speed of the carbon-ceramic brake disc 20 due to frictional force caused by friction between the frictional surfaces 21 of the carbon-ceramic brake disc 20 and the pads, the speed of the vehicle is reduced, or the vehicle is stopped.

The heat generated in the carbon-ceramic brake disc 20 when the brake pads 30 press the frictional surfaces 21 of the carbon-ceramic brake disc 20 is effectively dissipated through the heat dissipation holes 23 and the grooves G, or the heat dissipation holes 23, the grooves G and the curved surfaces 24 included in the carbon-ceramic brake disc 20.

More particularly, in the carbon-ceramic brake disc 20 according to the first embodiment of the present invention, since the heat dissipation holes 23 are formed in the frictional surfaces 21 and the grooves G are formed at the inner surface of the heat dissipation hole 23, the contact area with the air is increased, so that an area for dissipating the heat is increased. Thus, the frictional heat is effectively dissipated to the outside. In addition, when the groove G has a curve shape or a spiral shape, a vortex is generated by allowing the air to flow through the heat dissipation holes 23 during the rotation of the carbon-ceramic brake disc 20, so that the flow of the air become fast. As a result, the frictional heat is more effectively dissipated to the outside. Since the frictional heat generated in the carbon-ceramic brake disc 20 is effectively dissipated to the outside, the transferring of the frictional heat generated in the carbon-ceramic brake disc 20 to the hat part 10 is reduced, so that it is possible to minimize the deformation of the carbon-ceramic brake disc 20 and the hat part 10.

In the carbon-ceramic brake disc according to the second embodiment of the present invention, since the grooves G are formed at the inner surface of the heat dissipation hole 23 and the curved surfaces 24 are formed between the frictional surfaces 21 and the inner surface of the heat dissipation hole 23, the air can smoothly flow into and be discharged from the heat dissipation holes 23 and the grooves G, so that the frictional heat in the carbon-ceramic brake disc 20 is more effectively dissipated to the outside, in addition to the effects exhibiting in the first embodiment.

In the carbon-ceramic brake disc 20 according to the third embodiment of the present invention, since the curved surfaces 24 are formed between the frictional surfaces 21 and the inner surface of the heat dissipation hole 23, the air can smoothly flow into and be discharged from the heat dissipation holes 23 and the grooves G. Accordingly, the frictional heat in the carbon-ceramic brake disc 20 is more effectively dissipated to the outside.

In addition, when the curved surfaces 24 are formed between the frictional surfaces 21 and the inner surface of the heat dissipation hole 23, even though the brake pads 30 press the frictional surfaces of the carbon-ceramic brake disc, since an edge protruding from the heat dissipation hole does not exist, the brake pads 30 are prevented from being worn.

The invention claimed is:

1. A carbon-ceramic brake disc, comprising:
a first frictional surface formed at one side of the brake disc on which a brake pad can be pressed on;
a second frictional surface formed at the other side of the brake disc on which a brake pad can be pressed on, wherein the first frictional surface and the second frictional surface are in parallel with each other;

a plurality of heat dissipation holes formed penetrating between the first frictional surface and the second frictional surface, wherein each of the heat dissipation holes has an inner surface; and an inclined curved surface formed between an inner surface and the first frictional surface or the second frictional surface in each of the heat dissipation holes, wherein the inclined and curved surface includes an inclined convex-curved surface formed adjacent to the first frictional surface or the second frictional surface and an inclined concave-curved surface formed adjacent to the inner surface, and the inclined convex-curved surface and the inclined concave-curved surface have a predetermined radius of curvature, respectively.

2. The carbon-ceramic brake disc according to claim 1, wherein a groove is formed at each of the heat dissipation holes.

3. The carbon-ceramic brake disc according to claim 1, wherein grooves are formed at each of the heat dissipation holes.

4. The carbon-ceramic brake disc according to claim 2, wherein the groove has a straight line shape or a spiral shape.

5. The carbon-ceramic brake disc according to claim 3, wherein each of the grooves has a straight line shape or a spiral shape.

\* \* \* \* \*